Figure 1:
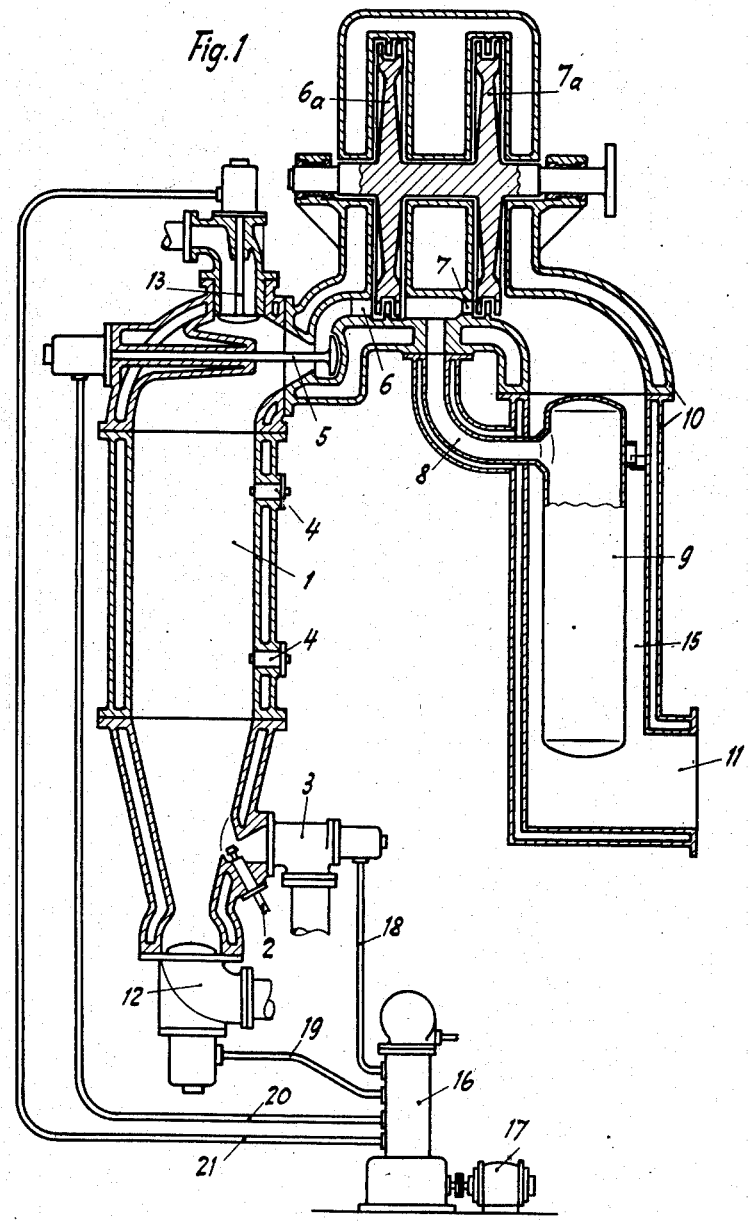

Oct. 7, 1941.   H. HOLZWARTH   2,257,745
EXPLOSION TURBINE AND METHOD OF OPERATING SAME
Filed Jan. 21, 1939   2 Sheets-Sheet 2

INVENTOR
Hans Holzwarth

Patented Oct. 7, 1941

2,257,745

UNITED STATES PATENT OFFICE 2,257,745

EXPLOSION TURBINE AND METHOD OF OPERATING SAME

Hans Holzwarth, Dusseldorf, Germany, assignor to Holzwarth Gas Turbine Co., San Francisco, Calif., a corporation of Delaware Application January 21, 1939, Serial No. 252,233
In Germany January 24, 1938

9 Claims. (Cl. 60—41)

The present invention relates to explosion turbines, that is, turbines operated by combustion gases generated periodically under constant volume, and has for its general object the provision of an improved method and apparatus for equalizing the pressure of the gases between the first or impulse turbine stage, and a subsequent continuous current stage without however, causing any considerable reduction in the working capacity of the gases.

Processes for the operation of explosion turbines whose pressure drop is divided into a portion exhibiting pressure variations and one or more portions which are approximately or entirely equalized as to pressure are now known, such compound gas turbine arrangements being characterized by a considerable increase in the economy of turbine operation over a single stage turbine. For equalizing the pressure fluctuations there are provided pressure equalizers between the turbine stages and advantageously in parallel with the gas conduit between the stages. The gases accordingly flow, upon increase of pressure, into the equalizer, while they escape therefrom through the same opening when the pressure falls. The excess of the available gas quantities is thus temporarily taken up by the pressure equalizer in order to add it again to the gas stream upon fall in the quantity of gases reaching the nozzles of the lower pressure turbine.

The pressure equalizer has heretofore been arranged with its walls exposed to the external atmosphere. To reduce the loss of heat, it has been suggested to arrange superheating coils adjacent to the walls of the equalizer for the steam generated with the waste heat of the plant. Attempts to insulate the walls of the equalizer led to technical difficulties because the insulation was not equal to the strong pressure and temperature variations without the use of special measures. By the use of both tubular coils traversed by working steam to be superheated and insulating masses between the superheater tubes and the walls of the equalizer, the heat losses through the walls of the equalizer were indeed reduced. However, the latter losses were still considerable, and the withdrawal of superheating heat greatly reduced the working capacity of the gases contained in the equalizer.

According to the present invention, the loss of heat from the gases stored in the equalizer is practically eliminated by subjecting the equalizer space to the influence of temperatures which are of the order of the average temperature of the gases filling the equalizing space. The pressure equalization accordingly occurs with little or no heat loss or withdrawal from these gases. This arrangement is practicable because there are building materials available which possess sufficient heat resistance at the gas temperatures existing in the equalizer. Since the conduits for the driving medium offer spaces of suitably high temperature, the explosion turbines constructed in accordance with the invention with pressure equalizers between the turbine stages are advantageously characterized by the arrangement of the pressure equalizers inside the stream of driving medium.

In a preferred form of the invention for turbine plants composed of an impulse turbine followed by a continuous current turbine, the equalizer is accordingly located in the exhaust conduit of the continuous current turbine, the turbine being so constructed that the exhaust gases are of suitably high temperature. Where the plant includes a superheater for steam generated with the waste heat of the plant or otherwise, such superheater is arranged not inside of the equalizer, as heretofore, but externally thereof, and preferably in the space between the equalizer and the walls of the exhaust conduit.

The drawings show two embodiments of the invention by way of example;

Fig. 1 representing a vertical section through a two-stage explosion turbine with arrangement of the pressure equalizer, provided between the two stages, in the exhaust conduit of the last turbine stage.

Figure 2:
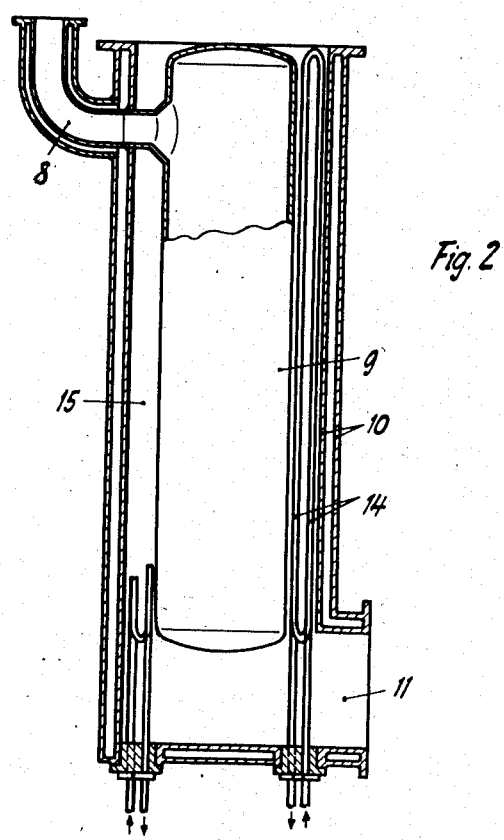
Figure 3:
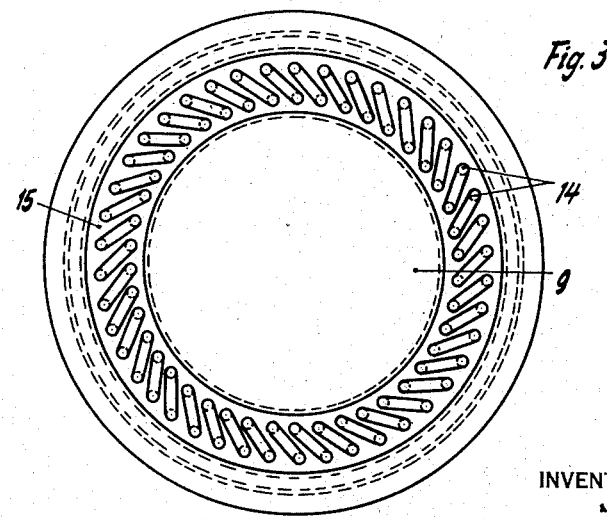

Fig. 2 shows in the same view an arrangement in which the annular space between the pressure equalizer and the exhaust conduit serves for receiving the superheating tubes, while Fig. 3 corresponds to a plan view of the arrangement according to Fig. 2 on an enlarged scale.

In Fig. 1 the numeral 1 designates one of a plurality of explosion chambers (in the example shown two are employed), which together supply the turbine stages with the driving medium. Each of the two explosion chambers 1 (of which only one is illustrated) is charged with fuel and air in known manner by the devices 2, 3, respectively. The so-formed ignitable mixture is ignited by the spark plugs 4. The high pressure, highly heated combustion gases generated in this way are discharged by way of the nozzle of outlet valve 5, which is illustrated in the open position, to the nozzles 6 of the first turbine stage 6a which is in the form of an impulse wheel. During the first part of the expansion, more combustion gases flow through the nozzle valve 5 and nozzles 6 than the subsequent nozzles 7 of the continuous current turbine 7a can utilize. The pressure in advance of the nozzles 7 accordingly rises, so that a part of the combustion gases flows off to the pressure equalizer 9 by way of the curved passage 8. In the further course of the expansion the pressure of the combustion gases in the explosion chamber 1 falls, the quantities of combustion gases flowing through the nozzles 6 per unit of time decrease correspondingly, so that the pressure in advance of the nozzles 7 falls. A portion of the gases stored up in the equalizer 9 accordingly flows back through the passage 8, and together with the reduced quantity of gases discharged by the nozzles 6 flows through the nozzles 7. Those gases which have been worked up in the second turbine stage leave the turbine housing through the exhaust pipe 10 and the discharge conduit 11 connected thereto. After closure of the nozzle valve 5, the residual combustion gases are scavenged out of the explosion chamber 1 upon opening of the scavenging air valve 12 and simultaneously opening of the discharge valve 13.

Whereas in known turbine plants of this type, the pressure equalizer 9 was provided outside of the driving medium-filled spaces of the explosion turbine and was arranged advantageously with its longitudinal axis parallel to the longitudinal axis of the explosion chambers 1 and between the latter and the discharge or exhaust conduit, the pressure equalizer in accordance with the invention is disposed in the discharge conduit 11 because thereby the possibility exists of eliminating the heat withdrawal from the combustion gases located in the pressure equalizer or to limit it to a very great extent. This possibility arises for the reason that the temperature conditions inside and outside of the pressure equalizer are approximately the same in the illustrated arrangement. The equalizer has a more or less permanent body of gas therein whose average temperature is lower than that of the working gases immediately in advance of the turbine 7a. This is due to the fact that the equalizer acts as a "lung," and receives only periodic pulses of pressure gases through conduit 8, the equalizer "breathing" in and out the relatively small volume of hotter gases flowing to and fro in such conduit. The average temperature of the main body of gases in the equalizer is but slightly affected by the gases entering temporarily through conduit 8, such temperature remaining quite close to that of the exhaust gases flowing past the equalizer. Insofar as a heat transfer to the exhausted gases should occur, it is slight and can be neglected even when, deviating from the usual arrangement, no heat exchangers are to be provided which withdraw the sensible heat from the exhaust gases and employ it usefully. According to the usual arrangement, however, this type of heat exchangers is always present as separate units, so that the utilization even of the negligible quantities of heat which are transmitted is afforded.

The arrangement according to the invention has, among other things, the advantages that no superheating heat for steam is withdrawn from the gases in the equalizer. The invention takes into account the fact that such heat can be withdrawn with considerably greater advantage from the gases whose pressure drop has already been completely utilized, i. e., the exhaust gases, because these gases, with suitable construction of the explosion turbine, possess a heat content which is still sufficient for the superheating. The working capacity or work drop of the combustion gases is thus no longer prejudiced in the expansion stages following the heat withdrawal by unnecessarily early heat withdrawal. The gases fed by the equalizer accordingly expand through a higher temperature range than heretofore and hence a higher efficiency is attained in the turbine 7a (and any subsequent turbines).

Figs. 2 and 3 show the special construction which this type of heat exchangers can be given while taking into account the arrangement of the pressure equalizer in the path of the exhaust gases proposed in accordance with the invention. The heat exchanger constructed in this case as a superheater consists of a number of tubular coils 14 which are positioned in the annular space between the pressure equalizer 9 and the discharge conduit 10 in the arrangement illustrated in Fig. 3. In this way there not only results an extremely compact and space-saving arrangement, but there is imparted to the exhaust gases in the annular space a higher velocity which leads to higher heat transfer by reason of the whirlings created in this way. To this superheating there is advantageously subjected the useful steam which was generated by circulation of the water through the cooling spaces of the explosion turbine, particularly of those of the explosion chambers, with utilization of the wall heat. The generation of the steam in this way, or indirectly in a boiler heated by a body of oil or other high boiling point substance which is circulated through the cooling jackets and boiler in series, is well known and the apparatus therefor has accordingly not been illustrated. It is shown, for example, in the United States Patents Nos. 2,012,963 and 2,095,984.

The inlet valves 3 and 12 and discharge valve 5 and auxiliary discharge valve 13 may be operated in timed relation by any suitable control mechanism, for example hydraulically with the aid of a pressure oil distributor 16 of known construction operated by a motor 17 and acting to place conduits 18, 19, 20 and 21 in connection with a body of high pressure oil at properly timed instants, such oil actuating the respective valves against an opposing spring, the distributor also relieving the conduits of pressure when the valves are to be closed. The operation of this type of distributor is well known and need not, therefore, be described in further detail.

I claim:

1. Process for the operation of multi-stage explosion turbines whose pressure drop is divided into a portion having pressure fluctuations and a portion which is entirely or approximately equalized as to pressure, comprising subjecting the space serving for the pressure equalization between the explosion turbine stage and a continuous stage to the influence of an external body of gas of a temperature of the order of the average temperature of the gases filling the equalizing space, whereby the pressure equalization occurs with reduction or elimination of the outflow of heat from the gases whose pressure is to be equalized.

2. In a compound explosion turbine, the combination of an explosion chamber, an impulse turbine arranged to receive the high pressure explosion gases discharged by said chamber, a continuous current turbine driven by the gases discharged by the impulse turbine, an exhaust conduit for receiving the at least partially spent gases after their discharge from the continuous current turbine and a pressure equalizer connected between the two turbines and arranged within the path of the gases discharged from the second turbine so as to be swept thereby.

3. An explosion turbine according to claim 2, wherein the pressure equalizer comprises a cylindrical tank and is arranged concentrically within the exhaust conduit.

4. An explosion turbine according to claim 2, wherein the pressure equalizer is arranged in the exhaust conduit of the last turbine stage.

5. An explosion turbine according to claim 2, wherein the equalizer is located in the exhaust conduit in spaced relation to the walls of the latter, and including a heat exchanger arranged in the intermediate space between pressure equalizer and the walls of the gas conduit.

6. In a compound explosion turbine, the combination of an explosion chamber, an impulse turbine arranged to receive the explosion gases periodically discharged by said chamber, a continuous current turbine, a conduit leading the partially exhausted gases from the impulse to the continuous current turbine, an exhaust conduit leading from the continuous current turbine, and a pressure equalizer connected to the first conduit and arranged in the exhaust conduit in spaced relation to the walls of the latter so as to be swept by the exhaust gases.

7. A turbine plant according to claim 6, including a heat exchanger disposed between the pressure equalizer and the walls of the exhaust conduit.

8. An explosion turbine plant as set forth in claim 2, wherein the turbines are provided with housings, and wherein the equalizer is disposed in the exhaust conduit of the housing to which it is connected.

9. An explosion turbine plant as set forth in claim 2, in which the equalizer is located in the exhaust conduit of the turbine immediately following the point of attachment of the equalizer to the turbine plant.

HANS HOLZWARTH.